US008576204B2

(12) United States Patent
Lees

(10) Patent No.: US 8,576,204 B2
(45) Date of Patent: Nov. 5, 2013

(54) METHOD AND APPARATUS FOR SYNCHRONIZING DISPLAY STREAMS

(75) Inventor: Jeremy J. Lees, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1241 days.

(21) Appl. No.: 11/502,823

(22) Filed: Aug. 10, 2006

(65) Prior Publication Data

US 2008/0036748 A1 Feb. 14, 2008

(51) Int. Cl.
*G06F 3/038* (2013.01)

(52) U.S. Cl.
USPC ........................... 345/204; 348/222.1; 345/76

(58) Field of Classification Search
USPC ........................................... 345/76, 100, 204
See application file for complete search history.

(56) References Cited

U.S. PATENT DOCUMENTS

| | | | | |
|---|---|---|---|---|
| 3,555,185 | A * | 1/1971 | Skrydstrup et al. | 348/512 |
| 4,496,977 | A * | 1/1985 | Ikeda | 348/540 |
| 4,929,935 | A * | 5/1990 | Rysavy et al. | 345/178 |
| 5,019,910 | A * | 5/1991 | Filmer | 725/68 |
| 5,410,222 | A * | 4/1995 | Flickner | 315/383 |
| 6,310,659 | B1 | 10/2001 | Glen | |
| 6,771,281 | B2 * | 8/2004 | Takagi | 345/690 |
| 7,176,965 | B1 | 2/2007 | Noguchi | |
| 7,319,787 | B2 | 1/2008 | Trifonov | |
| 7,885,462 | B2 | 2/2011 | Paik | |
| 2002/0149553 | A1 * | 10/2002 | Tsujimura et al. | 345/92 |
| 2005/0184933 | A1 * | 8/2005 | Tomohara | 345/76 |
| 2006/0023079 | A1 * | 2/2006 | Sugitani | 348/222.1 |
| 2008/0316334 | A1 | 12/2008 | Lee | |

FOREIGN PATENT DOCUMENTS

| | | |
|---|---|---|
| KR | 1019980041327 | 8/1998 |
| KR | 1019990073952 | 10/1999 |
| WO | WO00/52828 | 9/2000 |
| WO | WO2004/066068 | 8/2004 |

OTHER PUBLICATIONS

European Patent Office, Search Report issued in corresponding European Application No. 07840836.6, 7 pages, Jan. 14, 2010.
PCT International Search Report and Written Opinion issued in corresponding PCT/US/2011/066766 dated Sep. 14, 2012, (10 pages).

* cited by examiner

*Primary Examiner* — Sumati Lefkowitz
*Assistant Examiner* — Jose Soto Lopez
(74) *Attorney, Agent, or Firm* — Trop, Pruner & Hu, P.C.

(57) ABSTRACT

Apparatus, systems and methods for the synchronization of asynchronous display streams are disclosed. For example, a method is disclosed including receiving a first display data stream, receiving a second display data stream, determining a temporal offset between the first display data stream and the second display data stream, and adjusting at least one blanking interval of the second display data stream to reduce the temporal offset. Other implementations are also disclosed.

17 Claims, 5 Drawing Sheets

METHOD AND APPARATUS FOR SYNCHRONIZING DISPLAY STREAMS

BACKGROUND

Frame buffered displays incorporate memory to store image data so that they can continue to refresh displayed image data without requiring an external data source. Such displays typically have two image data sources, one external to the display, such as video data supplied by an operating system executing on an external processor system, and the other supplied internally by a display controller or other logic. Because it has an internal image data source, a frame buffered display may permit selective gating or disabling of the external data source to save power. When the internally stored image data needs to be updated the external data source may be re-enabled to provide fresh image data to the display.

At the time that the external data source is re-enabled the internal data source and the external data source are likely to be out of synchronization. Standard display data sources or streams convey image data accompanied by two strobe signals: a vertical synchronization (Vsync) signal and a horizontal synchronization (Hsync) signal. The Vsync signal typically indicates when the display hardware should initiate or return to scanning the display data starting from the left-upper-most pixel of the display, while the Hsync signal typically indicates when the display hardware should begin scanning from the left-most pixel of each row of display pixels. When the two data sources are not synchronized the user may experience flickering or other display artifacts when the external data source is re-enabled because a significant interval or offset may exist between the Vsync signals of the two data sources.

BRIEF DESCRIPTION OF THE DRAWINGS

The accompanying drawings, incorporated in and constituting a part of this specification, illustrate one or more implementations consistent with the principles of the invention and, together with the description of the invention, explain such implementations. The drawings are not necessarily to scale, the emphasis instead being placed upon illustrating the principles of the invention. In the drawings.

DETAILED DESCRIPTION

The following description refers to the accompanying drawings. Among the various drawings the same reference numbers may be used to identify the same or similar elements. While the following description provides a thorough understanding of the various aspects of the claimed invention by setting forth specific details such as particular structures, architectures, interfaces, techniques, etc., such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure descriptions of well known devices, circuits, and methods have been omitted to avoid clouding the description of the present invention with unnecessary detail.

Figure 1:
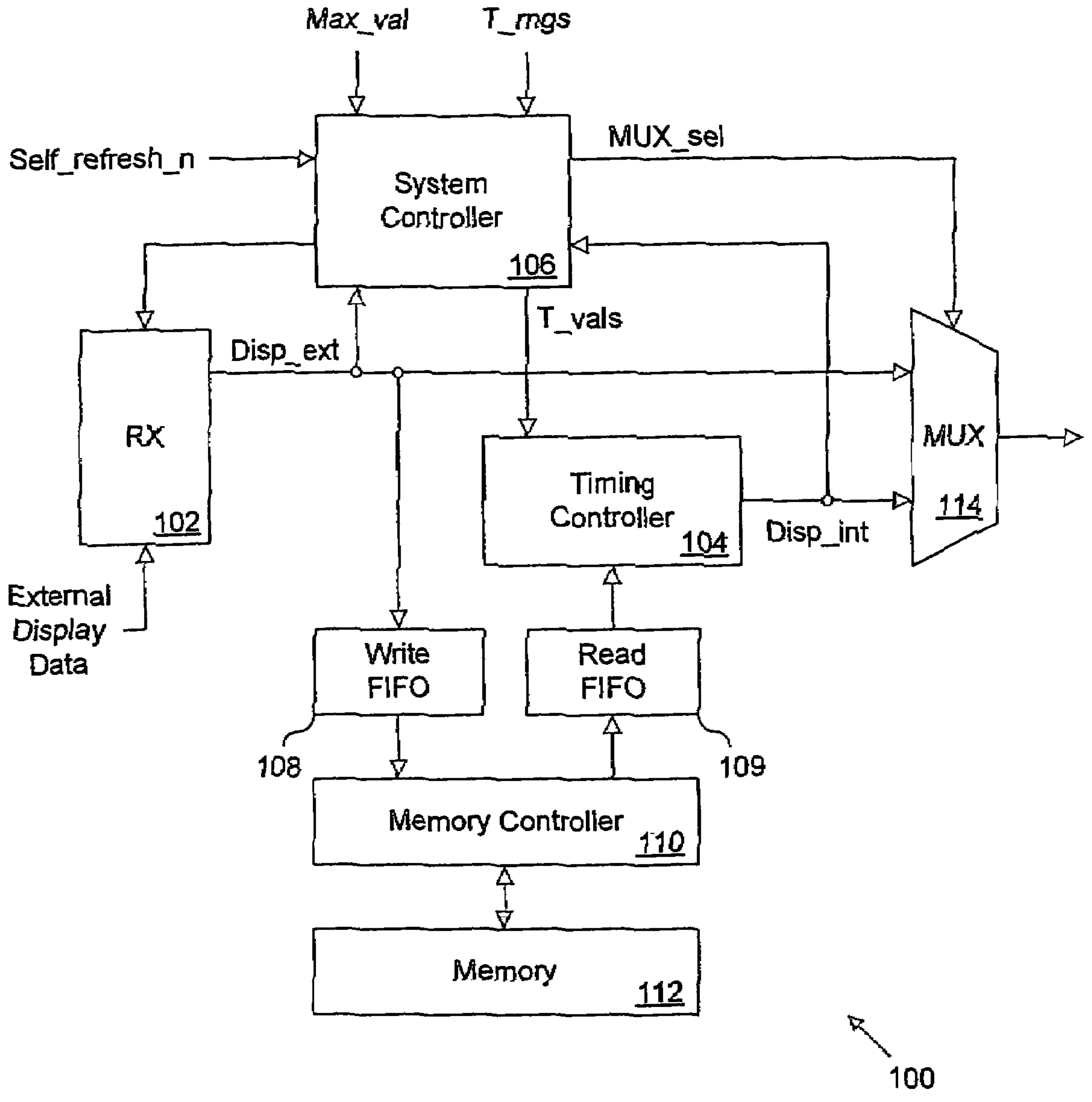
FIG. 1 illustrates portions of a frame buffered display controller system in accordance with some implementations of the invention.

FIG. 1 is a simplified block diagram of portions of a frame buffered display controller system 100 in accordance with some implementations of the claimed invention. System 100 may include a receiver (RX) 102, a timing controller 104, a system controller 106, write and read first-in-first-out (FIFO) buffers 108 and 109, a memory controller 110, memory 112, and multiplexer logic (MUX) 114. Those skilled in the art will recognize that some components typically found in or associated with a display controller system (e.g., audio components, row and column driver circuitry, etc.) and not particularly germane to the claimed invention have been excluded from FIG. 1 so as not to obscure implementations of the invention. A frame buffered display controller system, such as system 100, may be used to enable a display to operate in two modes: a "pass-thru" mode where a display data stream received by RX 102 is used to generate the signals required to display the data, and a "self-refresh" mode where image data and/or display data stored or held in memory 112 is used, in conjunction with timing controller 104, to generate an internal display data stream required to display the data when not in pass-thru mode.

RX 102 may be any display interface receiver logic (e.g., red-green-blue complementary metal-oxide semiconductor (RGB CMOS), low voltage differential signaling (LVDS), unified display interface (UDI), etc.) capable of receiving external image data and/or display data and of transforming that data into a usable form. The invention is not, however, limited by how RX 102 receives and transforms display data. The output (Disp_ext) of RX 102 may include an externally generated vertical synchronization timing signal (Vsync_ext) in addition to image data and/or pixel data. Those skilled in the art will recognize that the externally generated display data received by RX 102 may also include additional signals such as a horizontal synchronization timing signal, a device enable signal etc. that are not particularly germane to the invention. As those skilled in the art may also recognize, the Vsync_ext signal received by RX 102 as part of Disp_ext may, in pass-thru mode, be used to coordinate when a display panel (not shown) associated with display controller system 100 begins displaying the image data and/or pixel data starting with, typically, the left-most pixel of the upper-most row of the display panel.

Timing controller 104 may be timing logic including any combination of hardware, software and/or firmware and may be capable, when system 100 is in self-refresh mode, of retrieving image data and/or pixel data from memory 112 using read FIFO 109 and memory controller 110 and of generating internal vertical synchronization (Vsync_int) and horizontal synchronization (Hsync_int) timing signals to be used in displaying that image data and/or pixel data. In accordance with some implementations of the invention and as will be explained in greater detail below, controller 104 may also be capable of adjusting blanking periods associated with the Vsync_int and Hsync_int in response to timing values (T_vals) provided by system controller 106. The uses and functionality of timing controller 104 will be explained in greater detail below.

System controller 106 may be system logic (i.e., control and/or processing logic) including any combination of hardware, software and/or firmware and may be capable in accordance with some implementations of the invention of assessing, when system 100 is in self-refresh mode, the degree of synchronization or temporal offset between the internal vertical synchronization (Vsync_int) and the external vertical synchronization (Vsync_ext) timing signals to determine appropriate timing values (T_vals) to be provided to timing controller 104. System controller 106 may further, in accordance with some implementations of the invention, be capable, in response to the degree of synchronization between Vsync_int and Vsync_ext, of controlling MUX 114 to provide image data and/or display data from either RX 102 or timing controller 104 to row and column driver logic (not shown). System controller 106 may also, in response to self_refresh_n signal supplied by a device such as a host processor (not shown) or an internal source, transition back to a self refresh mode where the internal vertical synchronization (Vsync_int) is provided with the display and/or image data. The uses and functionality of system controller 106 will be explained in greater detail below.

Memory 112 may comprise any memory device or mechanism suitable for storing and/or holding image data and/or pixel data (e.g., in the form of red-green-blue (RGB) color values). Memory 112 may, in some implementations of the invention, be described as a frame buffer that stores image data and/or pixel data and/or display data. While memory 112 may comprise any volatile or non-volatile memory technology such as Random Access Memory (RAM) memory or Flash memory, the invention is in no way limited by the type of memory employed for use as memory 112. The invention is also not limited to particular implementations of read and write FIFOs 108 and 109, memory controller 110 and/or MUX 114 and thus these items will not be described in greater detail herein.

Figure 2:
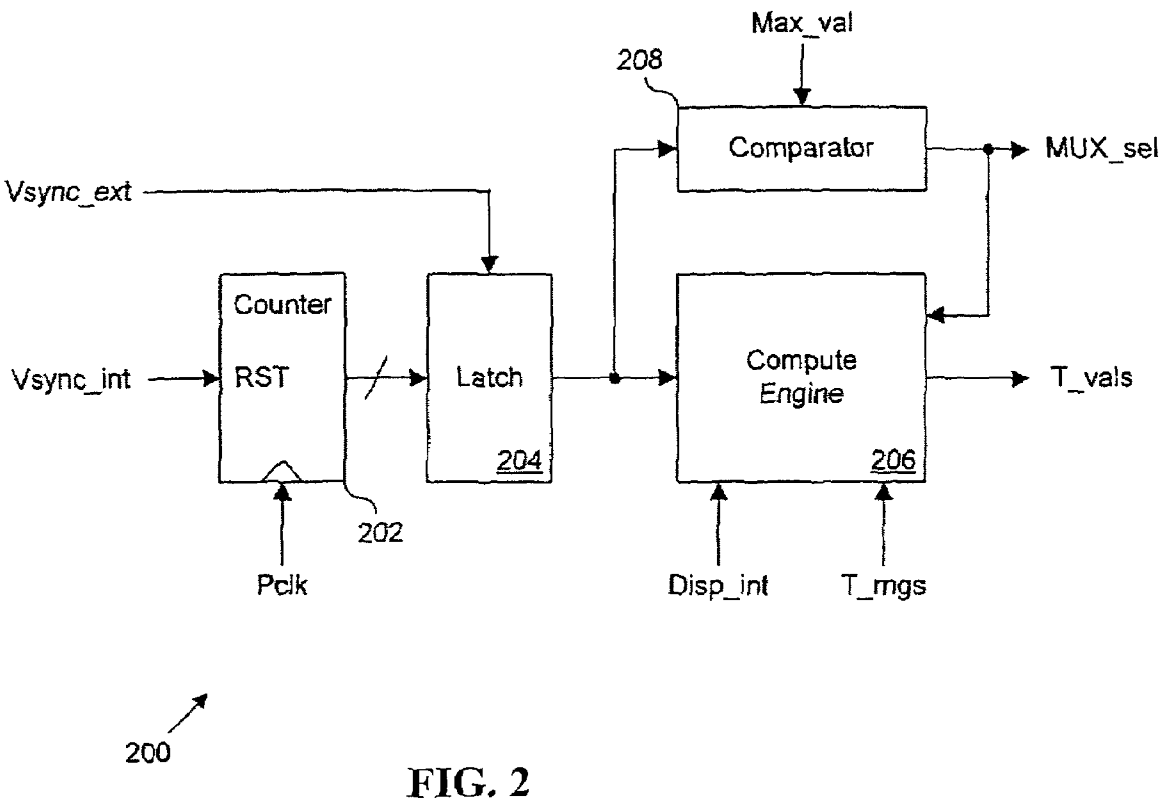
FIG. 2 illustrates portions of a frame buffered display system controller in accordance with some implementations of the invention.

FIG. 2 is a simplified block diagram of portions of a system controller 200, such as controller 106 of FIG. 1, in accordance with some implementations of the claimed invention. Controller 200 may include a counter 202, a latch 204, a comparator 208 and a compute engine 206. Counter 202 and latch 204 may be any measurement logic that, in accordance with some implementations of the invention, is capable of generating a count value proportional to a time interval or temporal offset between the two signals Vsync_int and Vsync_ext. Those skilled in the art will recognize how counter 202 and latch 204 may provide the functionality just described and hence these two elements will not be described in greater detail herein.

Compute engine 206 may comprise, in accordance with some implementations of the invention, compute logic including any combination of hardware, software and/or firmware capable of determining synchronization timing values (T_vals) or the duration(s) of one or more blanking intervals in response to a count value provided by latch 204 and in response to existing timing values (Disp_int) and to an acceptable range of values and/or permissible timing ranges (T_rngs) provided by a timing controller, such as timing controller 104 of system 100. The uses and functionalities of compute engine 206 will be described in greater detail below.

Controller 200 also includes a comparator 208 that, in accordance with some implementations of the invention, may comprise any comparator logic capable of comparing the count value provided by latch 204 to a predetermined maximum count value or maximum offset value (Max_val). If the count value exceeds the maximum value then comparator 208 may provide a signal (e.g., MUX_sel) instructing, for example, MUX 114 of system 100 to select the image data and/or display data output (Disp_int) of timing controller 104. Alternatively, for example, if the count value does not exceed the maximum value then comparator 208 may provide a signal (e.g., a negated MUX_sel) instructing MUX 114 of system 100 to select the image data and/or display data output (Disp_ext) of RX 102. The uses and functionalities of comparator 208 will be described in greater detail below.

Figure 3:
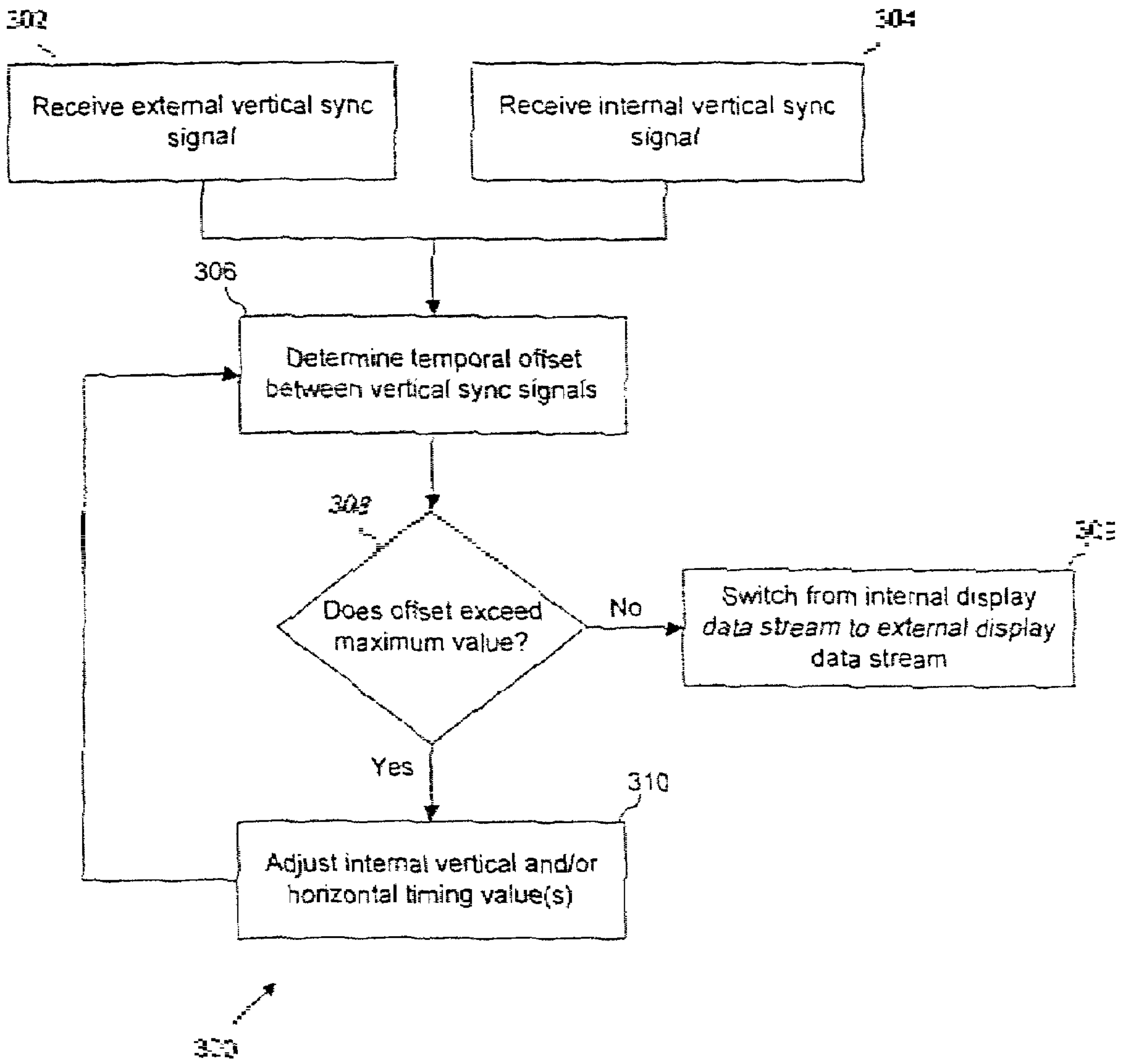
FIG. 3 is a flow chart illustrating a process in accordance with some implementations of the invention.

FIG. 3 is a flow chart illustrating a process 300 in accordance with some implementations of the invention. While, for ease of explanation, process 300 may be described with regard to system 100 of FIG. 1 and controller 200 of FIG. 2, the claimed invention is not limited in this regard and other processes or schemes supported by appropriate devices in accordance with the claimed invention are possible.

Figure 4:
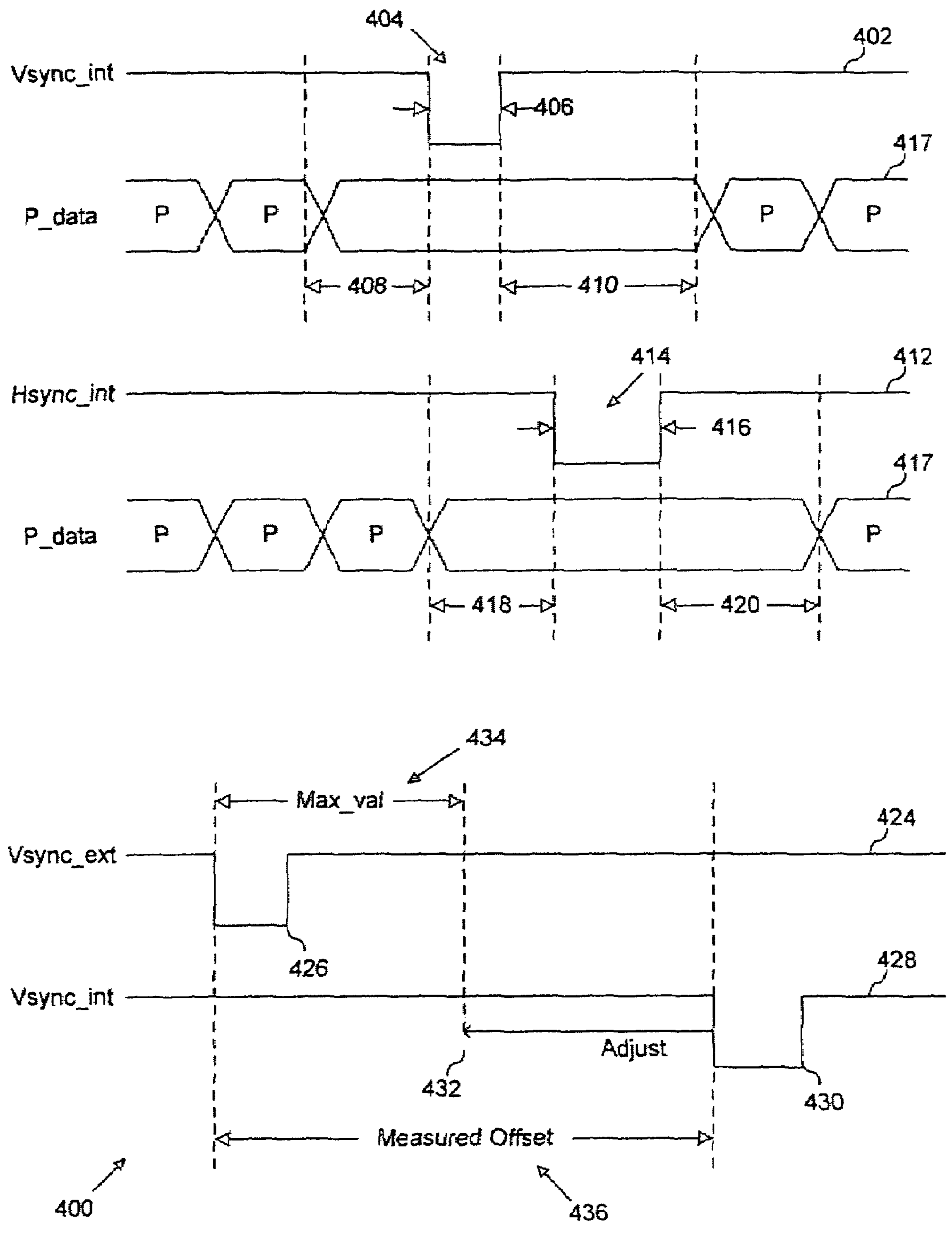
FIG. 4 illustrates portions of representative data signals in accordance with some implementations of the invention.

FIG. 4 illustrates portions of representative data signals 400 that, while aiding discussion of process 300, should not be construed to limit the claimed invention in anyway. Signals 400 include internally generated vertical and horizontal synchronization signals (Vsync_int) 402 and (Hsync_int) 412 such as may be generated or provided by timing controller 104 of system 100, in addition to a image data and/or pixel data (P_data) signal 417 such as might also be provided or generated by controller 104 where controller 104 has retrieved that image data and/or pixel data from memory 112. Thus, as those skilled in the art may recognize, the Disp_int output of timing controller 104 may include signals 402, 412 and 417 in addition to other signals (e.g., device enable etc.) that are not particularly germane to the invention and thus have not been illustrated in FIG. 4.

Vsync_int signal 402 includes a pulse 404 having a width 406 and two blanking intervals 408 and 410 defined, respectively, by the temporal offset or duration between pulse 406 and a last pixel of one frame of data signal 417 and a temporal offset or duration between pulse 406 and a first pixel of a next frame of data signal 417. Hsync_int signal 412 includes a pulse 414 having a width 416 and two blanking periods and/or blanking intervals 418 and 410 defined, respectively, by the temporal offset or duration between pulse 416 and a last pixel of one row of data signal 417 and a temporal offset or duration between pulse 416 and a first pixel of a next row of data signal 417. Although the invention is not limited by the term(s) used to describe intervals 408 and 410, those skilled in the art may recognize that blanking intervals 408 and 410 may be described, respectively, as a “front porch” and a “back porch” associated with pulse 404.

It should be noted, however, that in FIG. 4 the signals 402, 412 and 417 and the quantities associated with them are not necessarily illustrated to scale. Thus, for example, those skilled in the art will recognize that the width 406 of Vsync_int pulse 404 may be substantially larger than the pulse width 416 of Hsync_int pulse 414 as shown in FIG. 4. The invention is also not limited to particular values of widths 406 and 416 or of durations of blanking intervals 408, 410, 418 and 420 nor to how those blanking intervals are defined with respect to image data and/or pixel data signal 417.

FIG. 4 also shows a representative Vsync_ext signal 424 including a pulse 426 compared to a representative Vsync_int signal 428 including a pulse 430. In accordance with some implementations of the invention, a maximum offset value (Max_val) may be defined as a largest permissible temporal offset and/or timing difference between pulses 426 and 430. In other words, Max_val may represent a largest tolerable temporal offset between signals Vsync_ext and Vsync_int where temporal offsets between those signals that are greater than Max_val, such as measured offset 436, may result in synchronization artifacts as will be explained in greater detail below. In accordance with some implementations of the invention process 300 may be used to adjust the temporal offset between signals Vsync_ext and Vsync_int so that it is equal to or less than Max_val. In doing so the temporal position of pulse 430 may be adjusted relative to pulse 426. In other words, pulse 430 may, for example, be temporally adjusted to a new position 432 consistent with Max_val.

Process 300 may begin with receiving an external vertical synchronization signal [act 302] and receiving an internal vertical synchronization signal [act 304]. In some implementations of the invention, acts 302 and 304 may, respectively, involve system controller 106 receiving signals Vsync_ext from RX 102 and Vsync_int from timing controller 104. Thus, referring to system controller 200 of FIG. 2, act 302 may involve latch 204 receiving the Vsync_ext signal while act 304 may involve a reset input of counter 202 receiving the Vsync_int signal. In some implementations of the invention, process 300 may be implemented when a display timing system, such as system 100, is to transition from a self-refresh mode where internal image data and/or display data stream (e.g., Disp_int) is being used to drive the display to a pass-thru mode where external image data and/or display data stream (e.g., Disp_ext) is to be used to drive the display.

Process 300 may continue with determining the offset between the vertical synchronization signals [act 306]. In some implementations of the invention act 308 may be undertaken by counter 202 in conjunction with latch 204. As those skilled in the art will recognize, counter 202 and latch 204 may, in response to receiving respective signals Vsync_int and Vsync ext, provide to compute engine 206 and comparator 208 a signal proportional to the temporal offset or timing difference between Vsync_int and Vsync_ext. For example, the temporal offset may as be a count value produced by latch 204 where that count value is expressed in units of an internal pixel clock (Pclk). The invention is, however, not limited to using the logic shown in FIG. 2 to determine the offset in act 306 and other mechanisms or schemes, such as, for example, using software threads to calculate or determine the offset may be employed in act 306.

Process 300 may then continue with a determination of whether the temporal offset exceeds a maximum value [act 308]. Act 308 may be implemented by having comparator 208 compare the temporal offset (e.g., count value) provided by latch 204 to a predetermined maximum acceptable offset value (e.g., Max_val) supplied to comparator 208. While the invention is not limited to particular maximum acceptable offset values, a variety of factors such as, for example, display resolution and pixel clock frequency may contribute to an appropriate maximum acceptable offset value. If the count value does not exceed the maximum value then process 300 may continue with switching from an internal image data and/or display data stream to an external image data and/or display data stream [act 309].

In some implementations of the invention, act 309 may be undertaken by MUX 114 in response to system controller 106 providing a signal MUX_sel instructing MUX 114 to switch from providing display driver logic (not shown) with an internal image data and/or display data stream (Disp_int) to providing that logic with an external image data and/or display data stream (Disp_ext). System controller 106 may instruct MUX 114 to do so because there may be no need to synchronize the external image data and/or display data stream (e.g., Disp_ext including Vsync_ext) to the internal image data and/or display data stream (e.g., Disp_int including Vsync_int) because the temporal offset between Vsync_ext and Vsync_int determined in 306 does not exceed a maximum acceptable offset.

If, on the other hand, the temporal offset (e.g., expressed as count value) exceeds the maximum value then process 300 may continue with the adjustment of internal vertical and/or horizontal timing values [act 310]. In some implementations of the invention act 310 may performed by system controller 106 in response to an indication that the external and internal vertical synchronization signals received, respectively, in acts 302 and 304 have a temporal offset determined in act 306 that has been found, in act 308, to meet or exceed a maximum acceptable value. Thus, referring again to system controller 200 of FIG. 2, act 310 may, for example, involve compute engine 206 adjusting vertical and/or horizontal timing values in response to an indication from comparator 208 that the temporal offset between Vsync_int and Vsync_ext exceeds a maximum acceptable value.

Referring also to FIG. 4, act 310 may, in some implementations of the invention, involve providing compute engine 206 with the internal image data and/or display data stream (i.e., Disp_int) that includes the internal vertical synchronization signal (e.g., Vsync_int) 402 having a pulse width 406, image data and/or pixel data (e.g., P_data) 417 having at least two blanking intervals 408 and 410 defined with respect to the pulse 404 of internal vertical synchronization signal 402, and an internal horizontal synchronization signal (e.g., Hsync_int) 412 having a pulse width 416 where the image data and/or pixel data 417 has at least two additional blanking intervals 418 and 420 defined with respect to the pulse 414 of internal horizontal synchronization signal 412.

Compute engine 206 may then adjust the values for the pulse widths 404 and 414 and/or the durations of one or more of blanking intervals 408, 410, 418 and 420 in response to the internal image data and/or display data and in response to a permissible timing signal (e.g., T_rngs) instructing engine 206 as to acceptable ranges of timing values for pulse widths 404 and 414 and/or blanking intervals 408, 410, 418 and 420. In doing so, engine 206 may, in undertaking act 310, generate an indicator or signal, T_vals, instructing timing controller 104 to modify the values of pulse widths 404 and 414 and blanking intervals 408, 410, 418 and 420 so that the internal vertical synchronization signal (Vsync_int) of Disp_int has a modified temporal offset with respect to the external vertical synchronization signal (Vsync_ext).

Thus, if a temporal offset 436 as measured exceeds a maximum acceptable value 434 for that temporal offset, then act 310 may involve adjusting timing periods, durations or intervals associated with the internal image data and/or display data or stream. One way this may be done is to have engine 206 and/or timing controller 104 add or subtract one or more blank pixels from a pixel data signal (e.g., P_data signal 417). While the invention is not limited to particular values of the permissible timing signal, a variety of factors such as, for example, the nature of a display's row and column drivers and physical characteristics of a given display may contribute to acceptable ranges of timing values as indicated by T_rngs.

Process 300 may then return to another iteration of determination of the temporal offset [act 306] associated with the Disp_int modified in act 310 and the assessment as to whether that offset exceeds the maximum value [act 308]. If the adjustment(s) made in a first iteration of act 310 were sufficient, that is, if the adjustment(s) of act 310 have reduced the temporal offset between the internal and external vertical synchronization signals such that the offset does not exceed the maximum allowable value then process 300 may terminate. If, however, the adjustment(s) made in a first iteration of act 310 were not sufficient, that is, if the adjustment(s) of act 310 have not reduced the temporal offset between the internal and external vertical synchronization signals such that the offset does not exceed the maximum allowable value then process 300 may continue with another iteration of act 310 followed by acts 306 and 308.

Thus, in accordance with some implementations of the invention, acts 306-310 may repeat as many times as necessary until such time as the measured temporal offset is less than or equal to the maximum allowable value. Until a the measured offset is less than or equal to the maximum allowable value system controller 106 may use comparator 208 to provide a signal MUX_sel to MUX 114 instructing the MUX to continue providing the internal image data and/or display data (e.g., Disp_int including Vsync_int) to the display driver logic (not shown).

The acts shown in FIG. 3 need not be implemented in the order shown; nor do all of the acts necessarily need to be performed. Also, those acts that are not dependent on other acts may be performed in parallel with the other acts. For example, acts 302 and 304 may be undertaken in parallel. Further, at least some of the acts in this figure may be implemented as instructions, or groups of instructions, implemented in a machine-readable medium.

Figure 5:
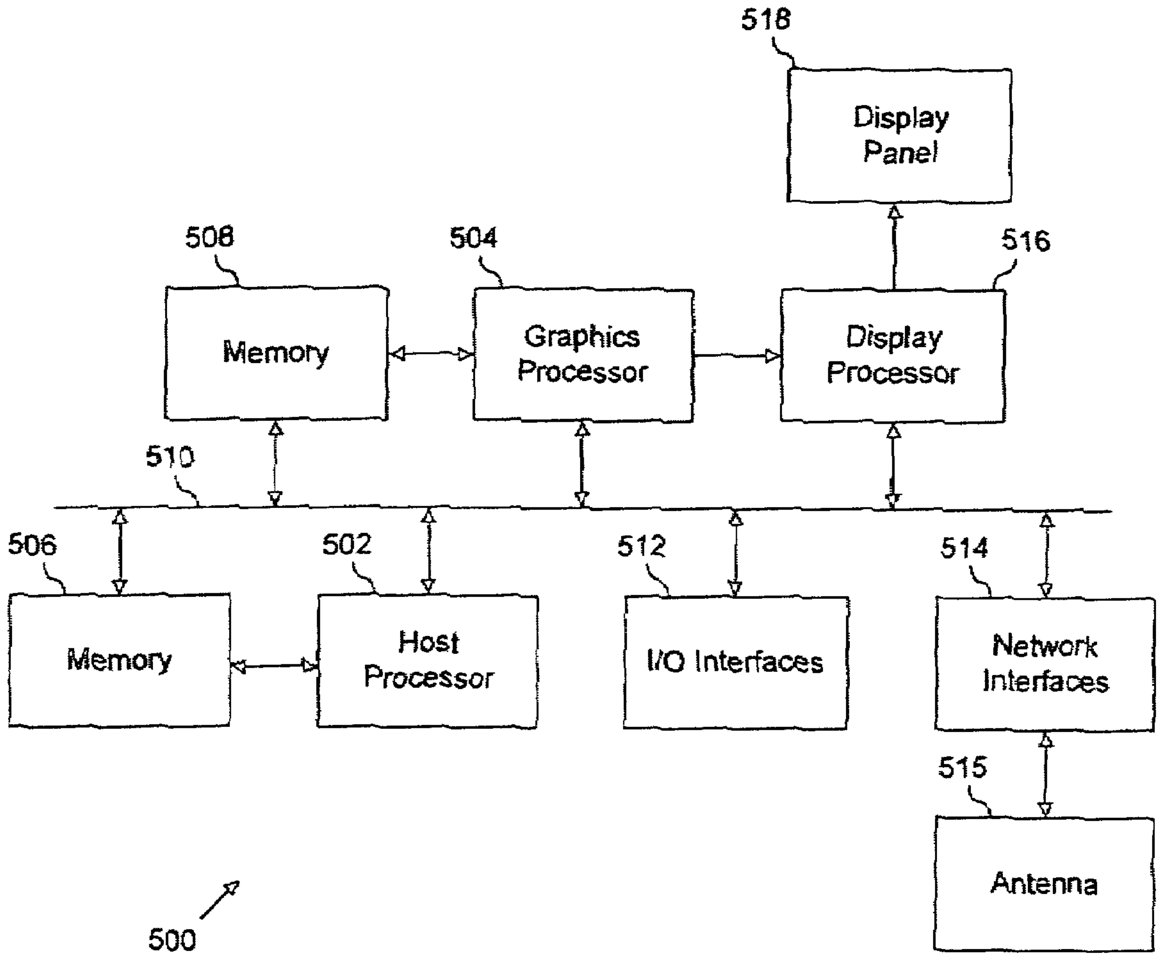
FIG. 5 illustrates a system in accordance with some implementations of the invention.

FIG. 5 illustrates an example system 500 in accordance with some implementations of the invention. System 500 may include a host processor 502, a graphics processor 504, memories 506 and 508 (e.g., dynamic random access memory (DRAM), static random access memory (SRAM), non-volatile memory, etc.), a bus or communications pathway(s) 510, input/output (I/O) interfaces 512 (e.g., universal synchronous bus (USB) interfaces, parallel ports, serial ports, telephone ports, and/or other I/O interfaces), network interfaces 514 (e.g., wired and/or wireless local area network (LAN) and/or wide area network (WAN) and/or personal area network (PAN), and/or other wired and/or wireless network interfaces), a display processor and/or controller 516, and a display panel 518. System 500 may also include an antenna 515 (e.g., dipole antenna, narrowband Meander Line Antenna (MLA), wideband MLA, inverted "F" antenna, planar inverted "F" antenna, Goubau antenna, Patch antenna, etc.) coupled to network interfaces 514. System 500 may be any system suitable for processing image data and/or display data streams, and specifically for synchronizing asynchronous display streams in accordance with the invention.

System 500 may assume a variety of physical implementations. For example, system 500 may be implemented in a personal computer (PC), a networked PC, a server computing system, a handheld computing platform (e.g., a personal digital assistant (PDA)), a gaming system (portable or otherwise), a 3D capable cellular telephone handset, etc. Moreover, while all components of system 500 may be implemented within a single device, such as a system-on-a-chip (SOC) integrated circuit (IC), components of system 500 may also be distributed across multiple ICs or devices. For example, host processor 502 along with components 506, 512, and 514 may be implemented as multiple ICs contained within a single PC while graphics processor 504 and components 508 and 516 may be implemented in a separate device such as display 518 coupled to host processor 502 and components 506, 512, and 514 through communications pathway 510.

Host processor 502 may comprise a special purpose or a general purpose processor including any control and/or processing logic, hardware, software and/or firmware, capable of providing graphics processor 504 or display processor 516 with image data and/or associated instructions. In one implementation, host processor 502 may be capable of performing any of a number of tasks that support synchronizing of asynchronous display streams. These tasks may include, for example, although the invention is not limited in this regard, providing logic in display processor 516 and/or display 518 with maximum temporal offset values (e.g., Max_val) and/or permissible timing value ranges (i.e., T_rngs), downloading microcode (via antenna 515 and interfaces 514) to processors 504 and/or 516, initializing and/or configuring registers within processors 504 and/or 516, interrupt servicing, and providing a bus interface for uploading and/or downloading image data, etc. In alternate implementations, some or all of these functions may be performed by graphics processor 504 and/or display processor 516. While FIG. 5 shows display processor 516 and display 518 as distinct components, the invention is not limited in this regard and those of skill in the art will recognize that processor 516 possibly in addition to other components of system 500 may be implemented within display 518.

Bus or communications pathway(s) 510 may comprise any mechanism for conveying information (e.g., graphics data, instructions, etc.) between or amongst any of the elements of system 500. For example, although the invention is not limited in this regard, communications pathway(s) 510 may comprise a multipurpose bus capable of conveying, for example, instructions (e.g., macrocode) between processor 502 and processors 504 or 516. Alternatively, pathway(s) 510 may comprise a wireless communications pathway.

Display panel 518 may be any display device, such as a frame buffered display panel, capable of displaying both internally and externally generated image data and/or display data or streams. Further, in accordance with some implementations of the invention, display panel 518 may include logic similar to that described above with respect to systems 100 and/or 200 and at least capable of performing process 300 as described above. In some implementations of the invention display panel 518 may be a liquid crystal display (LCD) panel. The invention is, however, not limited to a specific type of display technology and, thus, display panel 518 may be, for example, a plasma display panel (PDP).

Display processor 516 may comprise any processing logic, hardware, software, and/or firmware, capable of converting rasterized image data supplied by graphics processor 504 into a format suitable for driving a display (i.e., display-specific data). For example, while the invention is not limited in this regard, processor 504 may provide image data to processor 516 in a specific color data format, for example in a compressed red-green-blue (RGB) format, and processor 516 may process such RGB data by generating, for example, corresponding LCD drive data levels etc. Although FIG. 5 shows processors 504 and 516 as distinct components, the invention is not limited in this regard, and those of skill in the art will recognize that, for example, some if not all of the functions of display processor 516 may be performed by graphics processor 504 and/or host processor 502. In accordance with some implementations of the invention, processor 516 may include logic similar to that described above with respect to systems 100 and/or 200 and at least capable of performing process 300 as described above.

Thus, in accordance with some implementations of the invention, a frame buffered display timing controller may provide for the synchronization of asynchronous display streams by adjusting the horizontal and/or vertical blanking periods. In this manner several blank pixels and/or lines of blank pixels may be added or subtracted to change the amount of time it takes to transmit a frame of image data. Thus, a state machine in accordance with some implementations of the invention can monitor the vertical synchronous pulse associated with an externally generated display stream and the temporal or phase offset of that pulse with respect to an internally generated vertical synchronous pulse and may instruct the logic that generated the internal vertical synchronous pulse to shorten or lengthen vertical and/or horizontal blanking periods in order to reduce the temporal or phase offset to an acceptable value. In this manner, asynchronous display streams may be synchronized so as to avoid undesirable visual artifacts and/or damage to the display structure that may result from transitioning between asynchronous display streams.

While the foregoing description of one or more instantiations consistent with the claimed invention provides illustration and description of the invention it is not intended to be exhaustive or to limit the scope of the invention to the particular implementations disclosed. Clearly, modifications and variations are possible in light of the above teachings or may be acquired from practice of various implementations of the invention. Clearly, many other implementations may be employed to provide for the synchronization of asynchronous display streams consistent with the claimed invention.

No device, element, act, data type, instruction etc. set forth in the description of the present application should be construed as critical or essential to the invention unless explicitly described as such. Also, as used herein, the article "a" is intended to include one or more items. Moreover, when terms or phrases such as "coupled" or "responsive" or "in communication with" are used herein or in the claims that follow, these terms are meant to be interpreted broadly. For example, the phrase "coupled to" may refer to being communicatively, electrically and/or operatively coupled as appropriate for the context in which the phrase is used. In addition, the terms "display data", "image data" and "pixel data" have been used interchangeably throughout this specification. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A method comprising:

receiving a first display data stream from a frame buffer of a system to drive a display;

receiving a second display data stream from a source external to said system wherein the first display data stream comprises a first sync signal; wherein the second display data stream comprises a second sync signal; wherein the first sync signal comprises a first timing pulse having a width, a front porch on one side and a back porch on the other side;

determining a temporal offset between the first sync signal and the second sync signal using the first timing pulse;

determining whether the offset exceeds a limit; and if the offset exceeds the limit, adjusting timing values for said first data stream by adjusting the width, the front porch and the back porch of the first timing pulse.

2. The method of claim 1, wherein determining a temporal offset between the first display data stream and the second display data stream comprises determining a timing difference between a synchronization signal of the first display data stream and a synchronization signal of the second display data stream.

3. The method of claim 2, wherein the synchronization signal of the first display data stream and the synchronization signal of the second display data stream are vertical synchronization signals.

4. The method of claim 1, wherein the at least one blanking interval of the second display data stream comprises at least one blanking interval of a pixel data signal of the second display data stream.

5. The method of claim 1, further comprising:

providing the first display data stream to the display;

adjusting at least one blanking interval of the second display data stream until the temporal offset is less than or equal to a maximum offset value; and switching from providing the first display data stream to the display to providing the second display data stream to the display when the temporal offset is less than or equal to the maximum offset value.

6. The method of claim 1, wherein adjusting at least one blanking interval of the second display data stream comprises adding or subtracting one or more blank pixels to or from a pixel data signal of the second display data stream.

7. An apparatus comprising:

a frame buffer;

receiver logic to receive a first vertical synchronization signal of a first display data stream from the frame buffer wherein the first vertical synchronization signal comprises a first timing pulse having a width, a front porch on one side and a back porch on the other side;

measurement logic to determine a temporal offset between the first synchronization signal and a second synchronization signal of a second display data stream from a source external to the apparatus, the second display data stream including one or more blanking intervals; and compute logic to determine changes to durations of the one or more blanking intervals such that the temporal offset is less than or equal to a maximum temporal offset and, if not, to adjust timing values for said first display data stream by adjusting the width, the front porch and the back porch of the first timing pulse.

8. The apparatus of claim 7, further comprising:

multiplexer logic to provide either the first display data stream or the second display data stream; and comparator logic to compare the temporal offset to the maximum temporal offset, the comparator logic to indicate that the multiplexer logic should provide the second display data stream if the temporal offset is greater than the maximum temporal offset, else the comparator logic to indicate that the multiplexer logic should provide the first display data stream if the temporal offset is less than or equal to the maximum temporal offset.

9. The apparatus of claim 7, the compute logic to determine changes to durations of the one or more blanking intervals in response to an acceptable range of values for the one or more blanking intervals.

10. The apparatus of claim 7, further comprising:

timing logic to provide the second display data stream.

11. The apparatus of claim 10, the timing logic to adjust the durations of the one or more blanking intervals in response to the compute logic.

12. The apparatus of claim 11, wherein adjusting the durations of the one or more blanking intervals comprises adding or subtracting blank pixels to the second display data stream.

13. The apparatus of claim 7, further comprising a frame buffer to store pixel data, the second display data stream including the pixel data.

14. A system comprising:

a frame buffer;

a system controller to receive a first vertical synchronization signal of a first display data stream from the frame buffer and a second vertical synchronization signal of a second display data stream from a source external of said system wherein the first vertical synchronization signal comprises a first timing pulse having a width, a front porch on one side and a back porch on the other side;

a timing controller to provide the second display data stream, the second display data stream including a pixel data signal having one or more blanking periods; and a display panel coupled to the system controller, the display panel to receive one of the first display data stream or the second display data stream;

the system controller to determine a timing difference between to the first and second vertical synchronization signals, the system controller to instruct the timing controller to adjust durations of the one or more blanking periods by adjusting the width, the front porch and the back porch of the first timing pulse until the timing difference is less than or equal to a maximum value.

15. The system of claim 14, further comprising logic to provide either the first display data stream or the second display data stream to the display, the system controller to instruct the logic to provide the second display data stream to the display when the timing difference is greater than the maximum value, the system controller to instruct the logic to provide the first display data stream to the display when the timing difference is less than or equal to the maximum value.

16. The system of claim 14, further comprising:

memory to store the pixel data.

17. The system of claim 14, wherein the display panel comprises one of a liquid crystal display (LCD) panel or a plasma display panel (PDP).

* * * * *